US011620585B2

(12) United States Patent
Ciecko

(10) Patent No.: US 11,620,585 B2
(45) Date of Patent: Apr. 4, 2023

(54) INTELLIGENT SYSTEM FOR SEAT RESERVATION

(71) Applicant: Brendan Ciecko, Boston, MA (US)

(72) Inventor: Brendan Ciecko, Boston, MA (US)

(73) Assignee: Hexagon, Innovations, LLC, Boston, MA (US)

( * ) Notice: Subject to any disclaimer, the term of this patent is extended or adjusted under 35 U.S.C. 154(b) by 325 days.

(21) Appl. No.: 16/748,422

(22) Filed: Jan. 21, 2020

(65) Prior Publication Data

US 2021/0224698 A1 Jul. 22, 2021

(51) Int. Cl.
*G06F 16/00* (2019.01)
*G06Q 10/02* (2012.01)
*G06F 16/583* (2019.01)
*G06Q 50/10* (2012.01)
*G06F 16/54* (2019.01)
*G06F 16/532* (2019.01)

(52) U.S. Cl.
CPC ........... *G06Q 10/02* (2013.01); *G06F 16/532* (2019.01); *G06F 16/54* (2019.01); *G06F 16/5838* (2019.01); *G06F 16/5854* (2019.01); *G06Q 50/10* (2013.01)

(58) Field of Classification Search
CPC .... G06F 16/532; G06F 16/54; G06F 16/5838; G06F 16/5854; G06Q 10/02; G06Q 50/10
See application file for complete search history.

(56) References Cited

U.S. PATENT DOCUMENTS

| 2014/0122346 | A1* | 5/2014 | O'Brien | G06Q 30/0645 |
| | | | | 705/307 |
| 2017/0372551 | A1* | 12/2017 | Bruce | G07C 9/00571 |
| 2020/0167699 | A1* | 5/2020 | Cohen | H04L 51/52 |

* cited by examiner

Primary Examiner — Dinku W Gebresenbet
(74) Attorney, Agent, or Firm — Robert Schuler

(57) ABSTRACT

A seating reservation system running on a network server has functionality that can be trained to detect information relating to individual seats, their locations, and different seating types in a new or modified seating plan loaded into the system. This detected seating information can be maintained in seating plan files that can be edited to include metadata. Upon request, by a client application running under control a user, portions or all of the information in a seating plan file can be transferred as a web page to the client application for display and interaction with by the client application user for the purpose of completing a seat reservation process.

11 Claims, 8 Drawing Sheets

FIG. 3A

SEATING PLAN FILE 226

| OBJ.ID | SEAT.TYPE | SEAT COLOR | SEAT ROW/NMBER | LOCATION |
|---|---|---|---|---|
| SEAT.1 | HANDICAPPED | BLUE | ROW.D/SEAT.1 | $[X_1,Y_1,X_2,Y_2]$ |
| SEAT.2 | LOGE | RED | ROW.A/SEAT.1 | $[X_1,Y_1,X_2,Y_2]$ |
| ⋮ | ⋮ | ⋮ | ⋮ | ⋮ |
| SEAT.N | STAGE | YELLOW | ROW.B/SEAT.1 | $[X_1,Y_1,X_2,Y_2]$ |

FIG. 3B

SEATING PLAN FILE 226 w/METADATA

| OBJ.ID | SEAT.TYPE | LOCATION | PRICING | DISCOUNT | SERVICES |
|---|---|---|---|---|---|
| SEAT.1 | HANDICAPPED | $[X_1,Y_1,X_2,Y_2]$ | $10.00 | 30% | REFRESH |
| SEAT.2 | LOGE | $[X_1,Y_1,X_2,Y_2]$ | $80.00 | NO | FOOD & REFRESH |
| ⋮ | ⋮ | ⋮ | ⋮ | ⋮ | |
| SEAT.N | STAGE | $[X_1,Y_1,X_2,Y_2]$ | $40.00 | RESERVED | REFRESH |

FIG. 4A

SEAT PLAN METADATA TABLE 250

| SEAT TYPE | PRICING | DISCOUNT | SPECIAL SERVICES |
|---|---|---|---|
| LOGE | $PRICE.A | NO | FOOD & REFRESHMENT |
| STAGE | $PRICE.B | NO | REFRESHMENT |
| BALCONY | $PRICE.C | 10% | NO |
| HANDICAPPED | $PRICE.D | 30% | REFRESHMENT |

FIG. 4B

SEAT PLAN METADATA TABLE 251

| SEAT COLOR | PRICING | DISCOUNT | SPECIAL SERVICES |
|---|---|---|---|
| RED | $PRICE.A | NO | FOOD & REFRESHMENT |
| YELLOW | $PRICE.B | NO | REFRESHMENT |
| GREEN | $PRICE.C | 10% | NO |
| BLUE | $PRICE.D | 30% | REFRESHMENT |

FIG. 4C

SEAT PLAN METADATA TABLE 252

| SEAT ROW/NUMBER | PRICING | DISCOUNT | SPECIAL SERVICES |
|---|---|---|---|
| ROW.A/SEAT.1-SEAT.N | $PRICE.A | NO | FOOD & REFRESHMENT |
| ROW.B/SEAT.1-SEAT.N | $PRICE.B | NO | REFRESHMENT |
| ROW.C/SEAT.1-SEAT.N | $PRICE.C | 10% | NO |
| ROW.D/SEAT.1-SEAT.N | $PRICE.D | 30% | REFRESHMENT |

FIG. 5A
INTELLGENT SYSTEM TRAINING
INFORMATION 300
BALCONY SEATING IMAGE 301
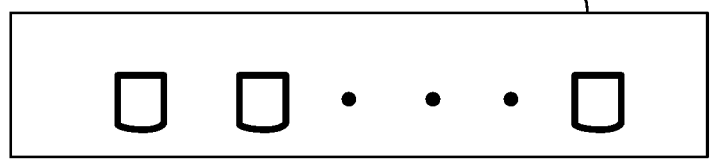
HANDICAPPED SEATING IMAGE 302
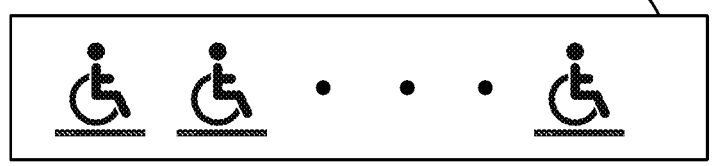
STAGE SEATING IMAGE 303
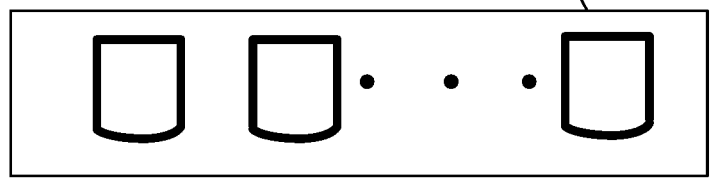
LOGE SEATING IMAGE 304
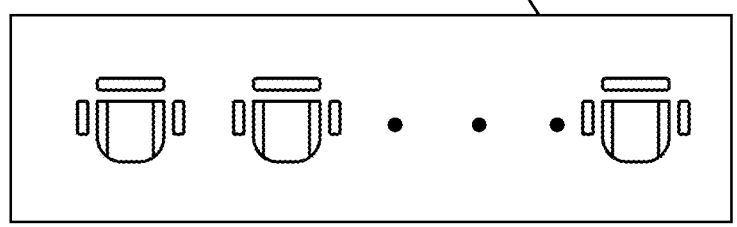

FIG. 5B
INTELLGENT SYSTEM TRAINING INFORMATION 310
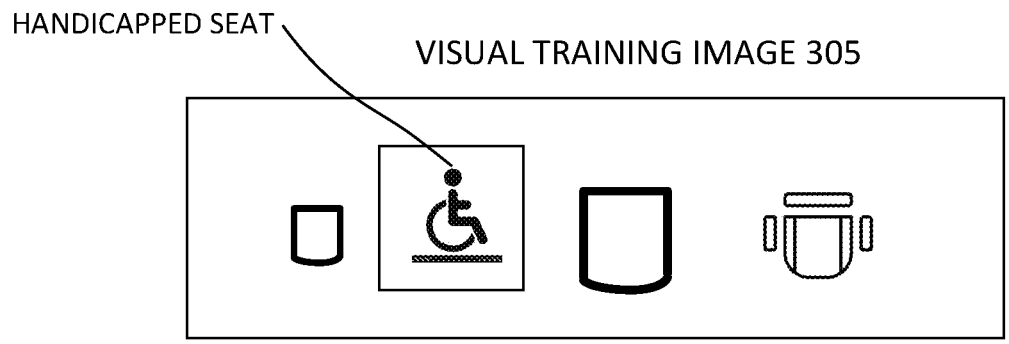
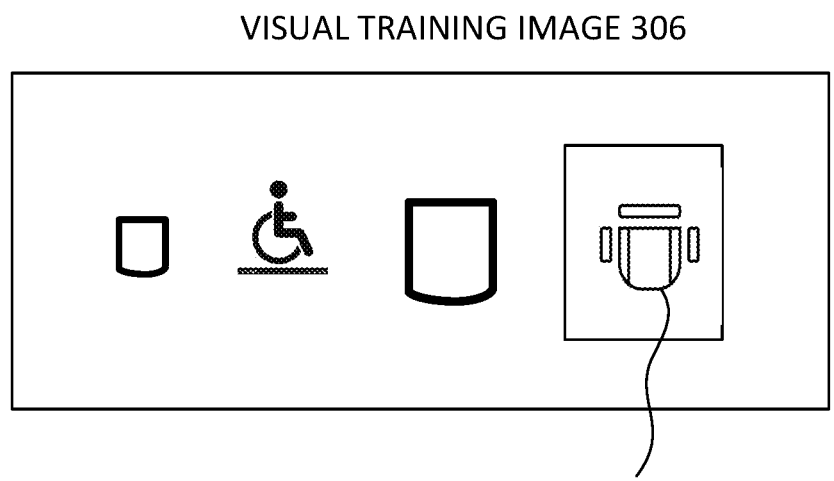
BALCONY SEATING
STAGE SEATING

NEW SEATING PLAN 350

INTELLIGENT SYSTEM FOR SEAT RESERVATION

1. FIELD OF THE INVENTION

The present disclosure relates to generating an interactive seating chart for use with a seating reservation system.

2. BACKGROUND

Some public or private venues maintain websites that support systems which are accessible by individuals for the purpose of reserving one or more seats for an event hosted by the venue. Museums, concert halls, and sporting and other types of venues can all maintain systems that are accessible for the purpose of reserving seating by requiring individuals to identify themselves and provide contact information, select one or more seats on a particular date and time, and to pre-pay for the reserved seating. Seating reservation systems can be implemented as mobile or desk-top applications, and a screen shot of an exemplary seating reservation system is shown with reference to FIG. 1. Seating reservation systems streamline the reservation process for both attendees and venues by providing a simple on-line reservation process (no waiting on a phone), and they obviate the need for venues to employ individuals to interact with event attendees for the purpose of reserving seating. Seating reservation systems save venues significant time and cost associated with selling tickets to events, maintaining an accounting of which seats have been reserved and which haven't, and maintaining an up-to-date accounting of revenue received from ticket sales.

3. BRIEF DESCRIPTION OF THE DRAWINGS

FIG. 3A is an example of a seating plan file 226.

FIG. 3B is an example of a seating plan file 226 having metadata.

FIGS. 4A, 4B and 4C are examples of a seating plan metadata tables 250, 251 and 252 respectively.

FIG. 5A illustrates different visual images that can be used as training for an intelligent system comprising the seating reservation system.

FIG. 5B illustrates combinations of different types of seating in training images.

4. DETAILED DESCRIPTION

Figure 1:
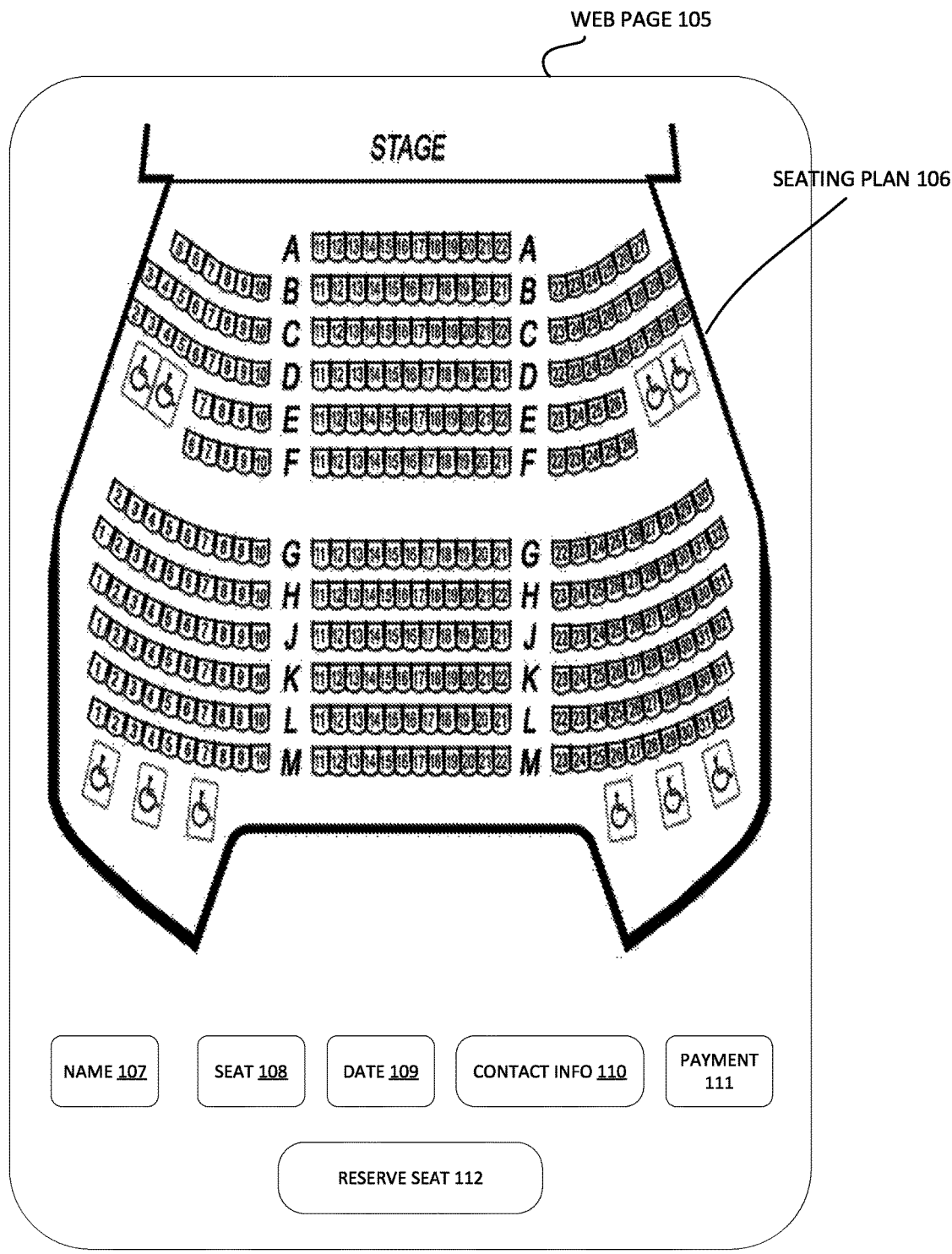
FIG. 1 is an example webpage illustrating a seating reservation system having interactive content.

Typically, seating floor plans associated with reservation systems have to be created or updated manually using a graphical user interface (GUI) tool capable of generating and placing individual seats or groups of seats into a particular location in an overall seating plan associated with a particular venue. Once a location is assigned to each seat or group of seats, the same or another tool may be used to assign metadata to each seat or grouping of seats. This metadata can be comprised of seat type information, (i.e., loge seating, stage seating, balcony seating, handicapped seating, and pricing for each) and seat reservation status information (i.e., reserved or unreserved, dates and times of the reservations). Using a graphical user interface to manually create a new seating plan, or to alter an existing plan, can be tedious, time-intensive work. Placing and identifying each seat or group of seats into the plan and then assigning metadata to each seat or grouping of seats can take a significant amount of time, which is time that can be better spent by venue employees.

I have designed a seating reservation system that removes much of the tedious and time-consuming manual work associated with generating a seating plan for a seating reservation system, and that removes much of the time-consuming manual work associated with assigning metadata to seats in the plan. According to one embodiment, a seating reservation system has an intelligent system that can be trained to recognize repetitive visual features. Subsequent to being trained, a visual image of a seating floor plan, having a plurality of seats in a particular arrangement that can be of the same or different types, can be loaded into the intelligent system, and the intelligent system can operate on the image to detect each repetitive visual feature (i.e., a seat) and its location in the visual image of the seating floor plan. The image of the seating floor plan can be in any format that is compatible with the intelligent system. It can be in a hand-drawn format, PDF, or in a format created by a graphical user interface, but regardless of the format of the visual image, the intelligent system operates on the image to generate output information that can be stored in a file format that can then be edited, to for example, add metadata to each repetitive visual feature, which in this case can be each one a plurality of individual seats. Alternatively, or additionally, the intelligent system can be trained to recognize groupings of repetitive visual features, and metadata can then be assigned to each grouping of the repetitive visual features. According to these embodiments, the repetitive visual features need not look like a seat, but the seats can be represented by any visual marking in the image, such as a geometric figure (i.e., square, circle, rectangle) or simply a dot or a dash.

According to another embodiment, the seating reservation system comprises an intelligent system that can be trained using a large corpus of seating floor plan images, each having a plurality of repetitive visual features that are verified to be seats. Subsequent to being trained, a visual image of a seating floor plan can be loaded into the intelligent system, and the system can operate to detect each repetitive visual feature (i.e., a seat) and its location with relation to other visual features comprising the visual image of the seating floor plan.

According to another embodiment, the seating reservation system comprises an intelligent system that is trained to recognize individual seats, and/or to recognize different types of seats, such as seats in a loge section of a theater, stage seating, handicapped seating or balcony seating, with each seating type having at least some metadata that is different than the other seating types, such as different pricing. According to this embodiment, images of different seating types comprising a seating plan can be represented differently in the plan. For example, handicapped seating can be represented by a wheel chair shape or icon, loge seating could be represented by an image particular size, shape or style, and so forth. The intelligent system can be trained to recognize each seating type, and according to one embodiment, the seating reservation system could be configured to automatically assign different metadata to each type of seating. So, for example, the output of the intelligent system can be one or more files having information relating to the locations and types of each seat or group of seats in a seating plan. The seating reservation system could be configured to examine the intelligent system output file information and automatically assign metadata to each seat based upon the seating type identified for each seat or group of seats.

These and other embodiments will now be described with reference to the figures, in which FIG. 1 is an illustration of a webpage 105 comprising a seating reservation system 100 that a communication device (mobile or otherwise) user can access through a client application running on the communication device or that can be accessed directly without the client application. Once the client application is connected to a server or webpage application running the seating reservation system, the user can interact with content comprising the webpage for the purpose of selecting one or more seats to be reserved for an event. The webpage 105 has an image of a seating plan 106, and six hyperlinks that the user can select in order to initiate a seating reservation process. The six hyperlinks are labeled NAME 107, SEAT 108 DATE 109, CONTACT INFO 110, PAYMENT 111 and RESERVE SEAT 112. When any of the hyperlinks are selected, the reservation system responds by sending the client application webpage information that allows it to display an interactive field that can be filled in by the user. Some or all of the hyperlinks may have to be selected in order to complete the seat reservation process.

Figure 2:
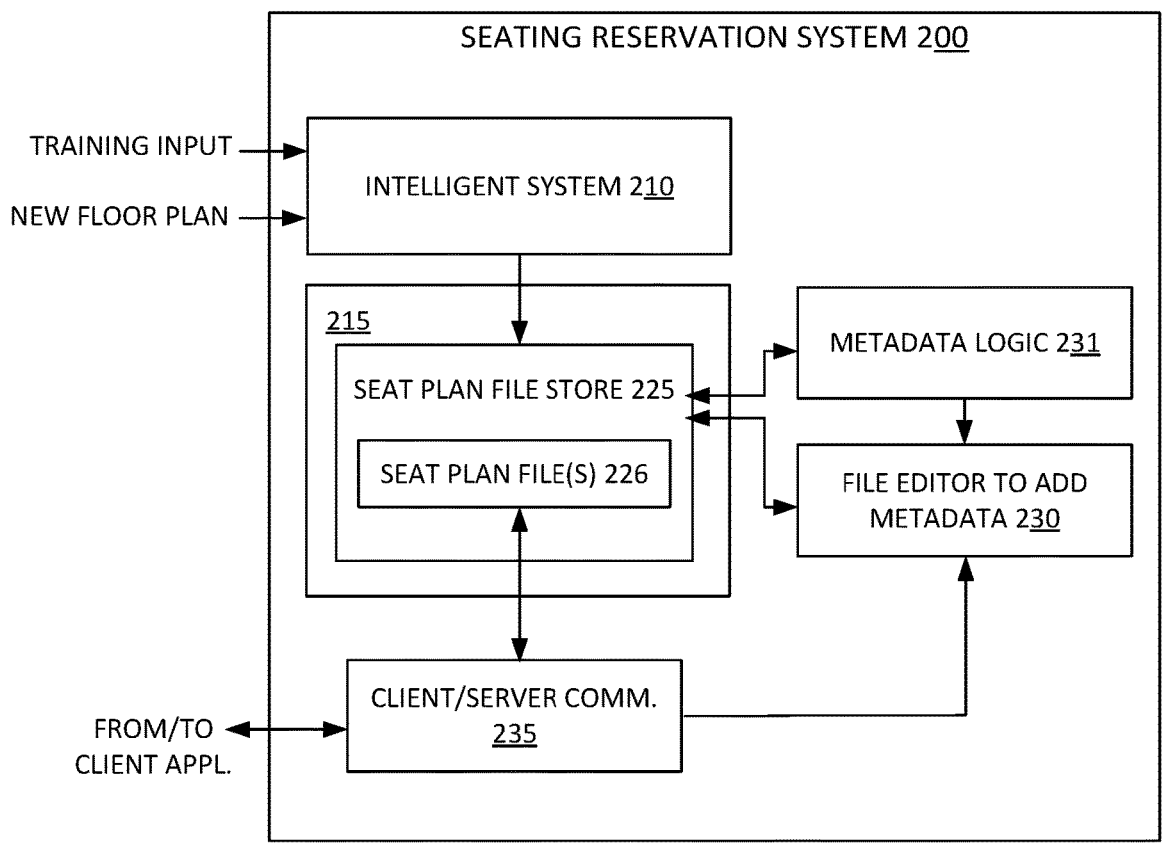
FIG. 2 is a block diagram showing functionality comprising a seating reservation system 100.

FIG. 2 shows functionality comprising a seating reservation system 200 running on a web server 205. As previously described, the seating reservation system can operate in cooperation with a client application, and all of the reservation system 200 functionality can run on the server 205, or the system 200 functional elements can operate in association with a first device and other functional elements can operate in association with a second device. Regardless of where the functional elements comprising the reservation system run, for the purpose of this description, it is assumed that all of the functional elements comprising the reservation system 200 operate in association with the networked server 205.

The seating reservation system 200 running on the server 205 in FIG. 2 is comprised of an intelligent system 210 that can be trained to identify and detect the location of repetitive visual images that are either still or moving (i.e., video) images, or it can be trained to identify and detect the location of individual seats in a visual image (still or moving) of a seating plan loaded into the intelligent system. The intelligent system can be implemented in a neural network, or it can be implemented in any type of computer application that is capable of identifying and detecting the location of repetitive visual images, such as seats in a seating plan. Regardless of the intelligent system 210 implementation, it can operate on a seating plan to generate information corresponding to the identity and location of each object or feature in the plan detected by the intelligent system, and this information can be maintained by a database system 215 in a store 225 as a seating plan file 226. One or more of these files can be maintained by database system 215 in the store 225 depending upon how many different seating plans are generated.

Continuing to refer to FIG. 2, the reservation system 200 can be configured with or without a database file editor 230. In the latter case, the editor 230 can be implemented separately from, but associated with, the reservation system. The database file editor 230 can operate to add metadata to each identified object or seat comprising the seating plan file, and this metadata can be in the form of, but not limited to, seat pricing information, seat discounting information and special services provided for different seat type. Some or all of the metadata information can be added to the seating plan file either manually using the file editor 230, or it can be added automatically by the file editor 230 under control of metadata logic 231. If added automatically, the logic 231, which is comprised of computer instructions maintained in a non-transitory computer readable medium, can operate to examine a seating plan file maintained in the store 225 to identify different types of seats. As previously described, the intelligent system 210 can be trained to identify different seating types (i.e., handicapped, stage, balcony, loge seating, etc.), and each seating type can be assigned metadata according to seating type metadata that can be maintained in one or more seating plan metadata tables that the logic 231 can access. Such a seating plan metadata tables 250, 251 and 252 are described later with reference to FIGS. 4A, 4B and 4C respectively. In operation, the editor 230 can assign metadata to some or all of the seats in a seating plan file, and the database system can store the modified seating plan, having the metadata in the same or different file.

Once a seating plan file has been modified to include metadata (i.e., all applicable metadata has been added), it can be accessible by a client application running on a communication device under the control of a user. When the user wants to access the reservation system 200 to reserve seating, they can initialize the client application which can send a request that the reservation system 200 to transmit the webpage information described earlier with reference to FIG. 1. More specifically, the client application can send the request to the client/server communication function 235 comprising the reservation system, and the communication function can operate on the request to determine whether to transfer seat plan file 226 information to the client, or to control the file editor 230 to make a change to the appropriate seat plan file 226. In the former case, the reservation system 200 can transmit information in a web page document to the client application. The user is then able to interact with the web page information to complete the process leading to the reservation of one or more seats. In the later case, the communication function 235 can determine that a message from the client application requires a change be made to a seating plan file 226, such as marking a particular seat as being reserved by a particular person.

As described earlier with reference to FIG. 2, the reservation system 200 maintains one or more seating plan files 226 in a store 225, and each one of these files can be comprised of seat identity information, seat type information, seat color information, seat row and number information, and seat location information and other information. FIG. 3A illustrates an example format for maintaining the identity, type, color, seat row/number, and location information associated with individual seats, or groups of seats, in any one of the files 226. A first column in the file 226, labeled OBJ.ID, is comprised of identities of objects detected by the intelligent system 210 in a seating plan image loaded into the system 200, A second column, labeled SEAT.TYPE, is comprised of a type of seat that is identified by the system 210 and associated with each object in the first column. A third column, labeled SEAT COLOR, has colors detected by the intelligent system 210 that are associated with each object in the first column. A forth column, labeled REAT ROW/NUMBER, has seat row and number information detected by the intelligent system 210 that is associated with an object in the first column, and a fifty column, labeled LOCATION, has location information generated by the intelligent system for each object it detects in the seating plan image. Depending upon how the intelligent system 210 is trained, and according to one embodiment, seat color and/or seat row and number information is not detected by the intelligent system 210, and in another embodiment, seat type, seat color and seat row and number information can be detected and used to very accurately determine what type of seating comprising a new seating plan.

FIG. 3B illustrates the format for maintaining the seating plan information shown with reference to FIG. 3A, but with the addition of metadata information, which in this case is pricing, discount and special services information. The location information shown in the seating plan file 226 is generated by the intelligent system 210 as the result of its operating on a seating floor plan, and this location information can be maintained in a seating plan file as two sets of cartesian coordinates (i.e., $X_1,Y_1,X_2,Y_2$), with the first set $X_1,Y_1$ representing an upper left corner of a bounding box, and the second set representing a lower right corner of the bounding box, for example. The generation of bounding box coordinate information by a machine vision system is well known to those skilled in this art, and so will not be described here is any detail. The intelligent system 210 in this case can operate on a seat plan image to generate a bounding box that surrounds each identified object (i.e., seat), and in this manner the coordinate associated with each bounding box can be used to represent the location of each seat on a seating plan.

FIGS. 4A, 4B and 4C are three different embodiments of a metadata table labeled Seat Plan Table 250, 251 and 252 respectively, each of which maintain metadata information in a particular format for use by the editor 230 described with reference to FIG. 2. Each of the tables is comprised of information that is used by the editor as a key into records maintained in the table. Information used as keys in the Table 250 is seat type information, the keys into Table 251 is seat color information, and the keys into Table 252 is seat row/number information. The Table 250 can have some number of records each one of which is stored in one row in the Table, and can be comprised of pricing, discount and special services information associated with each seat type, seat color or seat row and number. The editor 230 can operate to examine seating files 226 maintained in the store 225 for seat type information, seat color and seat row and number information, and then use this information as a pointer into the Table 250 to determine what pricing, discount, and special service information (collectively referred to here as metadata) to add to each seat in a seat plan file. The reservation system 200 is not limited to maintaining a metadata table having only pricing, discount and services information, but other types of metadata can also be maintained in such a table. The discount information can be assigned to some seats having obstructed or a limited view, or metadata information can be assigned to seating with special services (i.e., refreshments, concessions, etc.) in the form of additional add cost to the price of a seat.

As previously described, the intelligent system 210 should be trained to recognize objects that it is expected to detect in an image, and different types of visual images can be used to train the intelligent system. Although the intelligent system 210 can be trained to identify individual seats using visual images of one or more seats, this does not necessarily have to be the case, as visual images not having objects that appear to be seat can also be used during training. For example, the intelligent system in this case should be able to detect repetitive visual features, so the system can be trained with images that have any type of repetitive visual feature, as-long-as each feature is substantially the same as all of the other repetitive features in the image. The features can be dots, dashes, an irregular shape or any type of repeating geometric shape that is visually consistent in appearance. In this regard, FIG. 5A shows four different visual images, 301-304, with each image having a different type of repetitive visual features. Image 301 has a plurality of repetitive visual features of a particular size that represent balcony seats, image 302 has a plurality of repetitive visual features representing handicapped seating, image 303 has a plurality of repetitive visual features that representing stage seating, and image 304 has a plurality of repetitive visual features that represent loge seating. While the visual features in images 301 and 303 have the same general shape, the features in image 303 are measurably larger than those in image 301. According to an embodiment, the intelligent system 210 can be trained to identify the balcony or the stage seats based upon images having features that are otherwise similar, but that are of different sizes. According to other embodiments, the intelligent system 210 can be trained to recognize repetitive objects or seats having different colors, and seats that are labeled with row and number designations.

Alternatively, the intelligent system 110 can be trained using images having a mixture of seating types, and the seating type of current interest for the system 110 training can be identified in a manner that is understood by the intelligent system. One such intelligent system training methodology is to circumscribe an object of interest with a bounding box. In this case, one or more seats of a particular seating type can be circumscribed by a bounding box. This training method is illustrated by the images 305 and 306 in FIG. 5B. The image 305 has several different types of seats, but only the seating type assigned to handicapped seating is circumscribed by a bounding box. When the image 305 is used for training, the intelligent system 110 can learn that handicapped seating is represented by the image in the bounding box. In a similar manner, the image 306 shows the loge seating type being circumscribed by a bounding box. Once the intelligent system 110 is trained to identify particular types of seats, there is no need to retrain the system each time a new seating plan is loaded into the system, unless the new seating plan has seats that are visually or measurably different that those the intelligent system is trained to detect.

Figure 6:
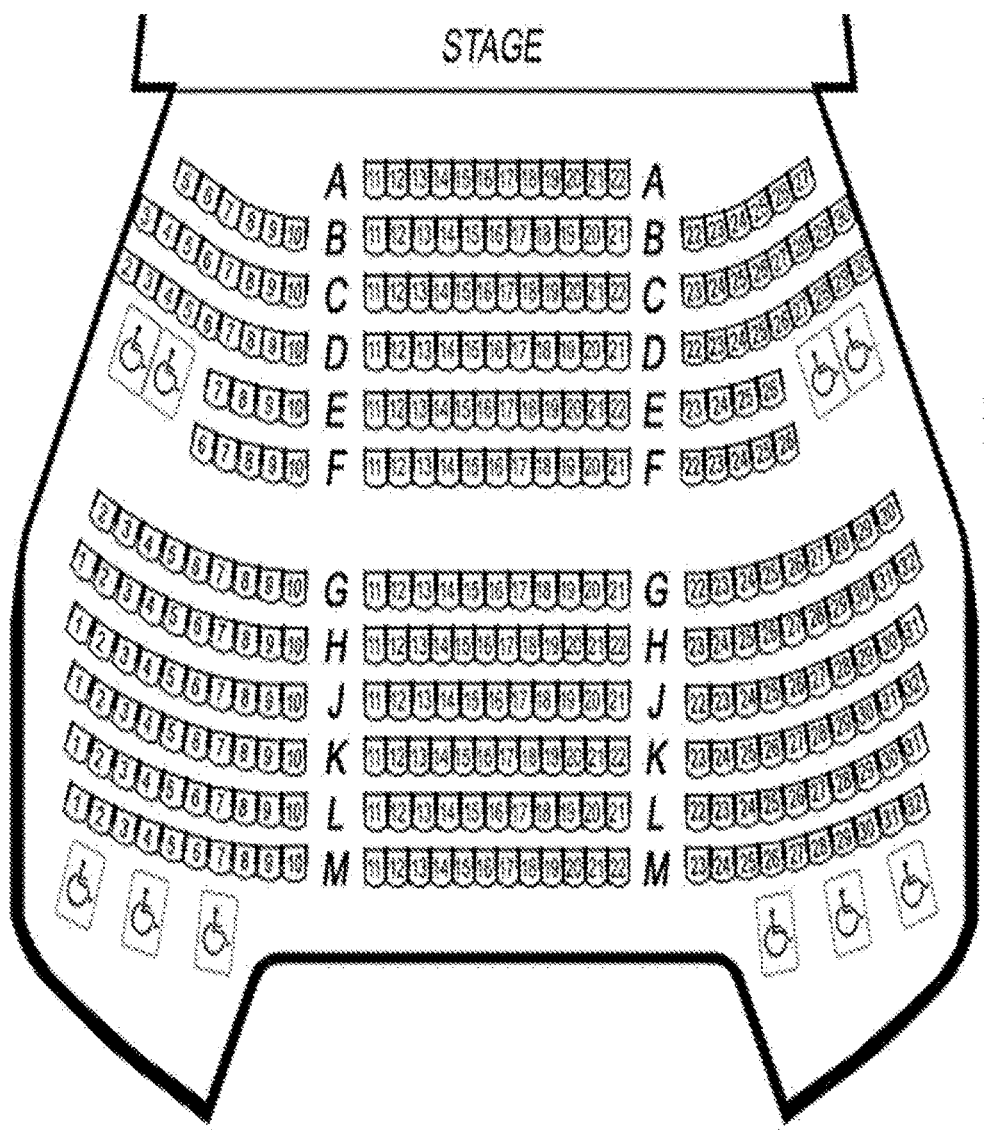
FIG. 6 is an illustration of a new seating plan 350 that can be loaded into the intelligent system comprising the seating reservation system.
Figure 7:
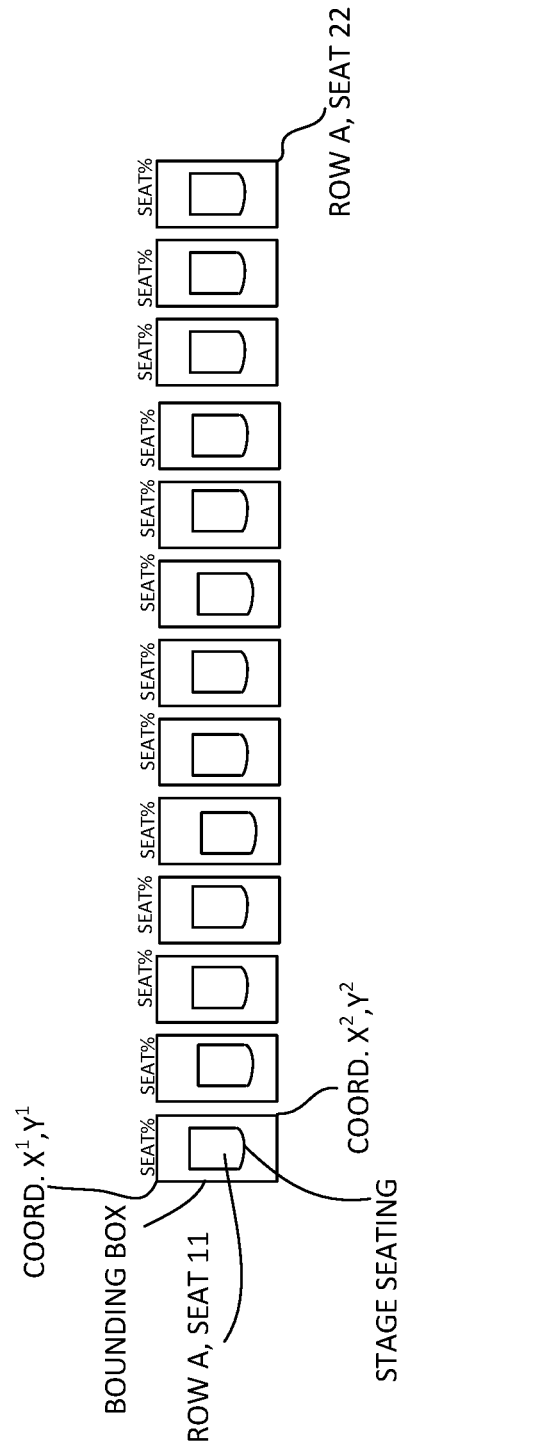
FIG. 7 is an example of output from the intelligent system.

Once the intelligent system 110 is sufficiently trained (i.e., the system can detect objects/seats it is trained to identify with some minimum degree of accuracy), a seating reservation system administrator can load a new seating plan into the seating reservation system 200. An example of a new seating plan 350 that can be loaded into the reservation system 200 is shown with reference to FIG. 6. The intelligent system 110 can operate on the new plan 350 to detect the location of each seat and identify the type or types of each seat in the plan. FIG. 7 illustrates information 400 that can be displayed as the result of the intelligent system 110 operating on the new plan 350. The information generated as output by the intelligent system typically looks similar to the input information, which in this case is the new seating plan; however, the intelligent system (being trained) can label each seat it detects with a seating type identifier, and it can assign a location to each seat that it detects. FIG. 7 shows only a portion of the entire new seating plan 350 illustrated in FIG. 6, and this portion is comprised of twelve seats in a row labeled ROW A, i.e., ROW A, SEAT 11 to SEAT 22. Each seat in ROW A can be labeled by the intelligent system with an appropriate seating type, which in this case is stage seating. Each seat is bounded by a box having two sets of coordinates that demarcate the upper-left and lower-right hand corners of each box, and the location coordinates of each seat can be maintained in a seating plan file, such as the file 226 described with reference to FIG. 3A. FIG. 7 also shows the predicted accuracy (as a percentage) with which the intelligent system 110 has correctly detected a seat of a particular type.

While the above description indicates that the reservation system is able to operate on an image of a new seating plan to detect individual seats, to determine what types of seat are detects and to assign location information to each seat, a modified image of a previously processed seating plan can also be operated on by the reservation system to generate similar seating information.

The forgoing description, for purposes of explanation, used specific nomenclature to provide a thorough understanding of the invention. However, it will be apparent to one skilled in the art that specific details are not required in order to practice the invention. Thus, the forgoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

I claim:

1. A method for generating an interactive seating chart for use in a seat reservation system connected to a network, comprising:
    training a neural network to detect objects corresponding to different types of seats in a visual image;
    loading information corresponding to a visual image of a seating plan into the seat reservation system, the seating plan having one or more objects corresponding to seats;
    detecting, by the neural network, information associated with objects corresponding to one or more seats in the visual image of the seating plan, a type of each seat, and a location of each seat, and assigning a unique identity to each one of the detected seats, and storing at least some of the object information in a computer file associated with the seat reservation system;
    assigning, by the seat reservation system, metadata to each one of the plurality of seats detected by the neural network according to the seat type detected by the neural network;
    generating, by the seating reservation system, the interactive seating chart using at least some of the detected information stored in the computer file;
    establishing, by an individual, a network connection with the seat reservation system for the purpose of displaying the interactive seating chart to initiate a seat reservation process; and
    interacting, by the individual, with the interactive seating chart to complete the seat reservation process.

2. The method of claim 1, wherein the metadata is assigned to each one of the plurality of seats in the seating plan file by a seating plan file editor comprising the seat reservation system.

3. The method of claim 1, wherein the neural network is trained to detect different seat types according to a geometric shape or size of a seat, a color of a seat or alphanumeric characters associated with a seat.

4. The method of claim 1, wherein the different seat types comprising the visual image of the seating plan are assigned one or more of different colors and different geometric shapes.

5. The method of claim 1, wherein the unique identity assigned to each seat comprising the visual image of the seating plan corresponds to a seat type.

6. The method of claim 5, wherein the unique identity assigned to each seat is an integer number, an alphabetical character or both.

7. The method of claim 1, wherein the individual completes the seat reservation process by selecting at least one or more seats stored in the seating plan file.

8. A method for generating an interactive seating chart for use in a seat reservation system connected to a network, comprising:
    training a neural network to detect different types of repeating features in a visual image, wherein the repeating features correspond to seats;
    loading a visual image of a seating plan into the seat reservation system, the seating plan having a plurality of repeating features;
    detecting by the neural network information associated with one or more of the repeating features in the visual image of the seating plan, the type of repeating feature, and a location of each repeating feature in the seating plan, assigning a unique identity to each of the repeating features and storing at least some of the information relating to the identity, type and location of each repeating feature in a computer file associated with the seat reservation system;
    assigning, by the seat reservation system, metadata to each one of the repeating features in the computer file according to the repeating feature type detected by the neural network;
    generating, by the seating reservation system, the interactive seating chart using at least some of the detected information stored in the computer file;
    establishing, by an individual, a network connection with the seat reservation system for the purpose of displaying the interactive seating chart to initiate a seat reservation process; and
    interacting, by the individual, with the interactive seating chart to complete the seat reservation process.

9. The method of claim 8, wherein the neural network is trained to detect different repeating feature types according to a geometric shape or size of a repeating feature, a color of a repeating feature or alphanumeric characters associated with a repeating feature.

10. The method of claim 8, wherein the different seat types comprising the visual image of the seating plan are assigned either or both of different colors and different geometric shapes.

11. A system for generating an interactive seating chart for use in a seat reservation system connected to a network, comprising:
    a webserver having:
        a neural network; and
        a database system;
            wherein the neural network is trained to process a visual image of a seating plan to detect one or more different types of seats, to assign a unique identity to each seat, and to determine a location of each detected seat; and wherein the database system operates in association with the neural network to maintain the identity, type and location information corresponding to each detected seat in a computer file, and to assign metadata to each of the one or more different types of seats according to the seat type detected by the neural network; and wherein the seating reservation system operates to generate an interactive seating chart using at least some of the detected information stored in the computer file;

an individual establishing a network connection with the seat reservation system for the purpose of displaying the interactive seating chart, and interacting with information stored in the interactive seating chart to complete the seat reservation process.

* * * * *